United States Patent [19]
Webster, Jr.

[11] 3,726,269
[45] Apr. 10, 1973

[54] CARDIOVASCULAR CATHETER FOR THERMAL DILUTION MEASUREMENT

[76] Inventor: Wilton W. Webster, Jr., P.O. Box 237, Altadena, Calif. 91001

[22] Filed: Nov. 24, 1971

[21] Appl. No.: 201,791

[52] U.S. Cl..............128/2.05 F, 73/194 M, 73/204, 128/348
[51] Int. Cl. ...............................................A61b 5/02
[58] Field of Search ....................128/2.05 D, 2.05 E, 128/2.05 F, 2.05 R, 348–351; 73/204, 194 M

[56] References Cited

UNITED STATES PATENTS

| | | | |
|---|---|---|---|
| 1,747,407 | 2/1930 | Wappler | 128/349 R |
| 3,419,010 | 12/1968 | Williamson | 128/350 R |
| 3,359,974 | 12/1967 | Khalil | 128/2.05 F |
| 3,605,726 | 9/1971 | Williams et al. | 128/2.05 F |
| 3,545,428 | 12/1970 | Webster | 128/2.05 F |
| 3,068,693 | 12/1962 | Ferran et al. | 73/204 |

*Primary Examiner*—William E. Kamm
*Attorney*—Hayden A. Carney

[57] ABSTRACT

A catheter for use in measuring blood massflow or ventricular volume by thermal dilution techniques is of the double lumen type in which the inner lumen is of very small diameter and is essentially flaccid. The inner lumen extends for the major portion of its length along a coolant liquid flow passage formed in a larger, more robust outer lumen of the catheter, but terminates in an anterior terminal portion outside the outer lumen adjacent the anterior end of the catheter. Apertures are formed through the outer lumen from the coolant flow passage. A dilution temperature sensor, such as a thermistor, is carried by the external anterior portion of the inner lumen in such relation to the apertures that the sensor is spaced from the apertures along a blood vessel, for example, regardless of whether the anterior terminal portion of the outer lumen trails back along the catheter in retrograde flow cases or forwardly toward the anterior end of the catheter in antegrade flow cases. The posterior end of the catheter carries means for injecting coolant liquid into the outer lumen and for connecting the temperature sensor to appropriate readout equipment, such as Wheatstone bridge circuit.

19 Claims, 8 Drawing Figures

PATENTED APR 10 1973　　　3,726,269
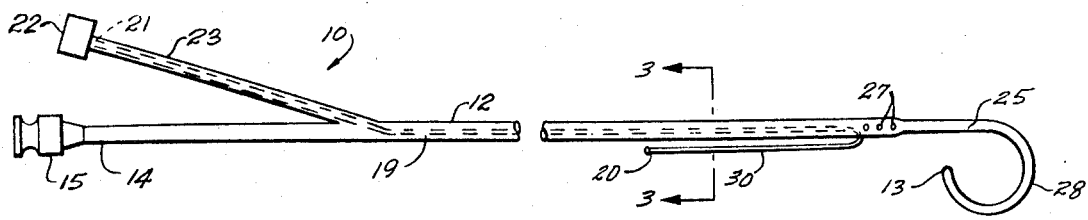
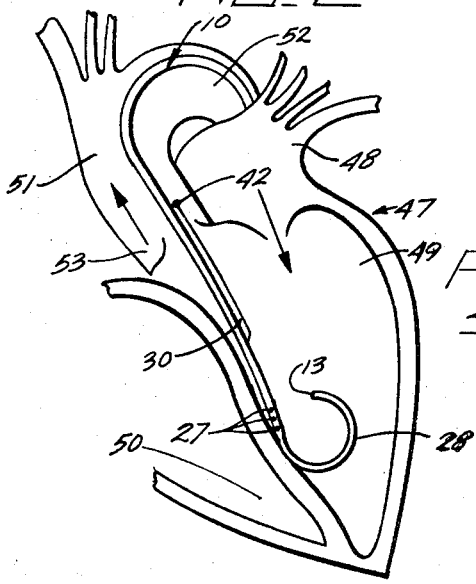
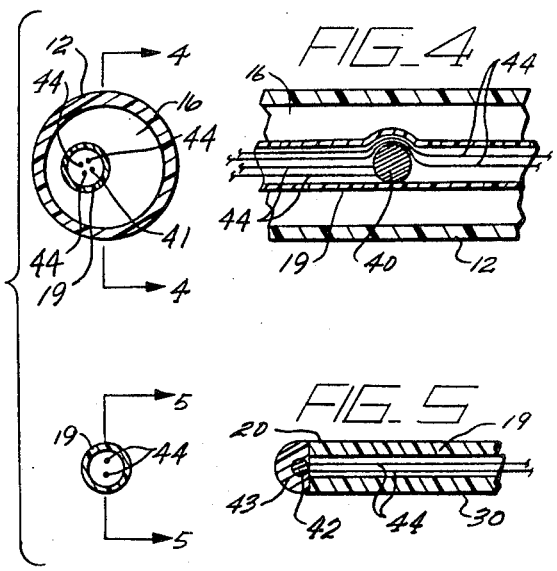
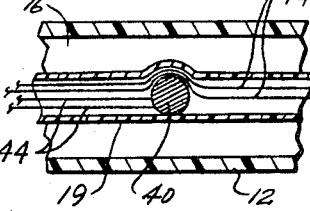
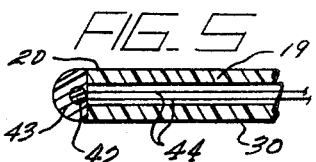
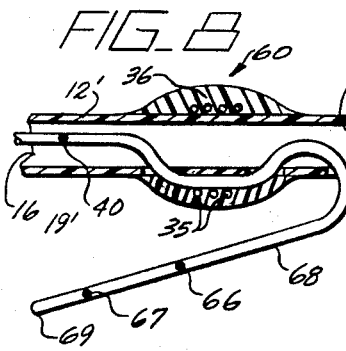
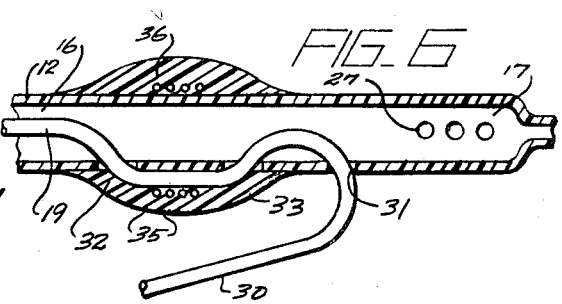
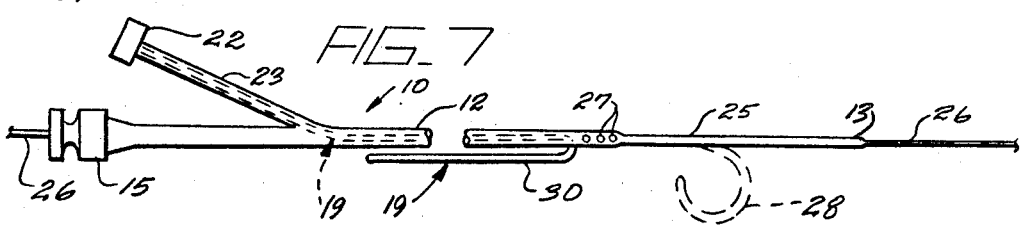

CARDIOVASCULAR CATHETER FOR THERMAL DILUTION MEASUREMENT

CROSS REFERENCE TO RELATED PATENTS

This application and the invention thereof is related to the subject matter of my prior U.S. Pat. No. 3,545,428.

FIELD OF THE INVENTION

This invention pertains to a cardiovascular flow meter catheter and, more particularly, to a catheter which is useful in both antegrade and retrograde flow conditions for use with thermal dilution techniques for measuring blood massflow and ventricular volumes.

BACKGROUND OF THE INVENTION

Thermal dilution techniques for measuring the massflow (volumetric flowrate rather than purely velocity flowrate) of blood in situ are known. According to these techniques, a known quantity of coolant liquid is injected into the bloodstream and the temperature of the blood-coolant mixture is measured. If the temperature of the coolant, the mass of the coolant, and the temperature of the blood before injection are known, the massflow of the blood can be determined from such data when the temperature of the blood-coolant mixture is also known. Blood massflow measurements by use of thermal dilution techniques may be carried out either on a pulsed basis or on a continuous flow basis, reference being made in each case to the nature of flow of the coolant liquid into the bloodstream.

In the pulsed flow thermal dilution technique, a discrete known quantity of coolant liquid at an allegedly known temperature is injected into the bloodstream upstream, in terms of blood flow direction, from a temperature sensor dispoed in a blood vessel. The output of the temperature sensor is monitored, as by a Wheatstone bridge circuit, and the dip in blood temperature produced by the mixture of blood and coolant as it flows past the sensor is measured. Specifically, the area under the curve resulting when blood temperature is plotted against time is a factor pertinent to massflow for the blood.

In a continuous flow thermal dilution technique, coolant liquid is injected into the bloodstream continuously at a uniform rate until the temperature of the coolant-blood mixture, as monitored by a temperature sensor, stabilizes at an essentially steady-state condition. The temperature sensor may be used to ascertain the temperature of the blood before coolant injection is commenced, and also to ascertain the resulting steady-state temperature of the blood-coolant mixture. Information about the difference between the temperature of the blood prior to coolant injection, and the steady-state temperature of the blood-coolant mixture, in conjunction with information concerning the temperature of the coolant as injected into the bloodstream and the rate in which coolant is injected, enables the massflow of blood past the sensor to be ascertained.

My prior U.S. Pat. No. 3,545,428 describes a flowmeter catheter adapted for use in the cardiovascular system of a human to obtain measurements of blood massflow by use of pulsed flow or continuous flow thermal dilution techniques. The catheter is so arranged that it may be used to advantage only in cases where the blood flow past the catheter is in an antegrade mode; i.e., the direction of blood flow through the vessel and the direction of catheter insertion through the vessel are the same; such a catheter is useful in many but not all locations of the body. For example, the flowmeter catheter described in U.S. Pat. No. 3,545,428 may be used to obtain blood flow measurements in the right atrium and the right ventricle of the heart, but cannot be used to obtain measurements of blood massflow in the left ventricle or the aorta, for example, where blood flow is in a retrograde mode past a catheter.

Blood flow conditions in and adjacent to the left ventricle, particularly cardiac output and left ventricular volume, are of especial interest since the left ventricle is the portion of the heart which is of significant concern to cardiac specialists. It is this portion of the heart which pumps oxygenated blood to the body; the right ventricle pumps oxygen-poor blood through the pulmonary arteries to the lungs from which the blood, rich in oxygen, flows back to the heart through the left atrium to the left ventricle.

Thermal dilution techniques have been used to obtain measurements of cardiac output and of left ventricular volume. In the past, these measurements have been made by the use of separate coolant injection catheters and temperature sensing catheters, and by the use of separate catheters these measurements have been made simultaneously; for example, see "Simultaneous determination of the stroke volume and the left ventricular residual fraction with the fiberoptic — and thermodilution method" by Bussmann, Krayenbuhl and Rutishauser, Cardiovascular Research, 1971, No. 5, pgs. 136–140. Such measurements were made by injecting a bolus of coolant liquid (pulsed flow thermal dilution technique) into the left ventricle to mix thoroughly with blood in the ventricle and by measuring the temperature of the blood downstream of the aortic valve; see, for example, "A New Technique for Measurement of Cardiac Output by Thermodilution in Man," by Ganz et al., American Journal of Cardiology, April, 1971, pgs. 392–396, which is addressed to right ventricular measurements. These dual-catheter procedures were subject to measurement errors (see Ganz et al.) and were difficult to obtain because of the difficulties attendant to the use of separate catheters.

A need exists, therefore, for a single catheter assembly which may be used in and adjacent the left ventricle to obtain accurate simultaneous measurements of cardiac output and left ventricular volume.

SUMMARY OF THE INVENTION

This invention satisfies the need described above by providing a single catheter assembly useful in obtaining accurate simultaneous measurements of cardiac output and left ventricular volume by thermal dilution techniques. The catheter is useful in both antegrade and retrograde flow conditions with either pulsed flow or continuous flow thermal dilution techniques. Thus, the invention provides a single assembly which may be arranged to perform specific measurements, or it may be arranged to be of substantially general use in substantially any portion of the circulatory system where a catheter may be positioned.

The present catheter is simple, effective and efficient and, when fabricated of sterilizable materials as is preferred, may be reused. The catheter is so arranged that blood massflow measurements obtained by its use are well within the range of accuracy expected of biological measurements and are repeatable.

Generally speaking, this invention provides a flowmeter catheter which includes an elongate, slender, flexible tube. A slender, flexible, flaccid probe is disposed within the tube through a substantial portion of the length of the tube. The probe has an outer diameter which is sufficiently less than the inner diameter of the tube to provide a liquid flow passage within the tube around the probe. The passage extends to coolant liquid jet discharge means located at an anterior end of the passage adjacent an anterior end of the tube. Means are coupled to the posterior end of the tube for injecting a coolant liquid into the passage. The probe extends through the tube adjacent the coolant jet discharge means to a terminal portion of the probe which is disposed externally at the tube. An electrical temperature sensing device is mounted to the terminal portion of the probe for sensing the temperature of liquid flowing past the device.

DESCRIPTION OF THE DRAWINGS

The above-mentioned and other features of this invention are more fully set forth in the following description of presently preferred embodiments of the invention, which description is presented with reference to the accompany drawings, wherein:

FIG. 1 is an elevation view of a catheter according to this invention;

FIG. 2 is a simplified cross-sectional view of the human heart illustrating a use of the catheter shown in FIG. 1 to obtain simultaneous measurements of left ventricular volume and cardiac output;

FIG. 3 is an enlarged cross-section view taken along line 3–3 of FIG. 1;

FIG. 4 is a cross-section view taken along line 4—4 of FIG. 3;

FIG. 5 is a cross-section view taken along line 5—5 in FIG. 3 and shows the anterior end of the terminal portion of the probe of the catheter shown in FIG. 1;

FIG. 6 is an enlarged cross-section elevation view of the catheter of FIG. 1 in the vicinity of the catheter where the probe passes through the walls of the tube adjacent to the coolant jet discharge means of the catheter;

FIG. 7 is an elevation view of the catheter of FIG. 1 illustrating the manner in which the catheter is inserted into the body for use; and FIG. 8 is a fragmentary cross-sectional elevation view of the anterior portions of another catheter according to this invention.

DESCRIPTION OF THE ILLUSTRATED EMBODIMENTS

A blood flowmeter catheter 10 shown in FIG. 1 includes an elongate, slender, flexible, inherently resilient and yet substantially inelastic tube 12 which has an anterior end 13 and posterior end 14. A fitting 15, such as a Luer fitting, is connected to the posterior end of tube 12 to adapt the outer lumen of the catheter for connection to the barrel of a suitable syringe, for example. Fitting 15 is arranged so that a chilled liquid coolant medium, such as glucose or a saline solution, may be injected into the interior of the catheter outer lumen for flow within the outer lumen along a fluid flow passage 16 (see FIGS. 3 and 4, for example) toward an anterior end 17 (see FIG. 6) thereof adjacent the anterior end of tube 12. Preferably, tube 12 is defined by a suitable length, say 48 inches long, of thin-wall X-ray-opaque tetrafluoroethylene tubing which has a circumference of about 7 mm (No. 7 French), although it will be understood that tube 12 may be defined of materials other than tetrafluoroethylene. Regardless of the type of material used to define the outer lumen of the catheter, the material should have local resiliency, be easily deformable, and be chemically inert in the presence of blood. Additional desired characteristics of the material from which tube 12 is made is that the material should be strong, soft and flexible, and a tubing of such material should not expand diametrically when subjected to axially applied compressive loads.

Catheter 10 also includes an elongate, slender, flexible and yet inherently resilient probe 19 which has an anterior end 20 and a posterior end 21. It is preferred that probe 19 be defined by a suitable length of clear tetrafluoroethylene tubing which has an outer diameter of 0.021 inch or so; a probe fabricated of this material possesses exceptional strength and fatigue resistance, and is very limp and flaccid as is desired in catheter 10 for the reasons which are made apparent in the following description.

As shown best in FIG. 1, the major portion of the length of probe 19 is disposed within tube 12 along a substantial portion of the length of the probe. Adjacent the posterior end 14 of tube 12, probe 19 passes through the walls of tube 12 and extends to a multi-terminal electrical connector 22 to which the posterior end of the probe, and the conductors disposed within the probe, are connected. Between the connector and tube 12, the posterior terminal portion of probe 19 is disposed within a supporting flexible sleeve 23. Probe 19 forms the inner lumen of catheter 10.

Preferably the inner diameter of tube 12 is at least about two-thirds of the outer diameter of the tube. The outer diameter of probe 19 is sufficiently smaller than the inner diameter of tube 12 that liquid flow passage 16 has substantial cross-sectional area along those portions of the interior of tube 12 also occupied by probe 19.

As illustrated most clearly in FIGS. 1 and 7, tube 12 has an anterior terminal portion 25 which is of reduced outer diameter relative to the remainder of the length of the tube. The inner diameter of the tube is also reduced throughout the extent of anterior portion 25 to a diameter of about 0.035 inch which corresponds to the preferred size of guidewire 26 (see the following description) which may be used to facilitate the placement of the anterior end of the catheter at the desired location in the circulatory system. The reduced diameter of the tube anterior terminal portion facilitates the definition of loop configuration 28 in the tube, and assures that the anterior end of the catheter cooperates snugly with the guidewire so that the catheter readily may be inserted percutaneously into an artery with minimum flow of blood through the catheter during insertion and placement. The reduced inner diameter of tube 12 opens to the anterior end 13 of the tube to permit guidewire 26 to be passed through the catheter as shown in FIG. 7. Because the interior diameter of tube 12 is restricted throughout the length of anterior terminal portion 25, it is apparent that liquid flow passage 16 has an effectively closed anterior end adjacent to but spaced from the extreme anterior end of tube 12.

A plurality of coolant liquid exit apertures 27 are formed through the walls of tube 12 adjacent the anterior end 17 of passage 16 as shown in FIG. 6. The apertures form the coolant liquid jet discharge means of catheter 10. Apertures 27 are provided so that a suitable coolant liquid injected into passage 16 via fitting 15 may escape from the passage into that portion of the circulatory system in which is disposed that portion of the catheter through which the apertures are formed. Preferably the apertures are distributed symmetrically around the circumference of tube 12 and also for a short distance along the length of the tube as shown in FIG. 6. The apertures are arranged so that liquid coolant ejected from passage 16 through the apertures flows radially away from the outside of the catheter rather than primarily along the length of the catheter. It is within the scope of this invention, however, that the coolant liquid jet discharge means may be arranged to discharge liquid from the flow passages within the tube along the length of the catheter. The important criterion is that the jet discharge means be arranged at or adjacent the anterior end of the catheter so that coolant liquid discharged from the catheter during its use mix thoroughly with blood flowing past the jet discharge means within a short distance of the jet discharge means. Radial discharge of the coolant liquid from catheter 10 assures complete mixing of the coolant liquid with blood flowing either in an antegrade mode or a retrograde mode past the apertures.

The total area of apertures 27 is substantially larger than the area of the opening of the reduced inner diameter of the tube to the anterior end of the tube after guidewire 26 has been withdrawn from the catheter. It is seen, therefore, that passage 16 effectively terminates at that portion of tube 12 where reduced diameter anterior terminal portion 25 commences.

If desired, as shown in FIG. 1, the anterior terminal portion 25 of tube 12 is biased during the manufacture of the catheter to assume a loop configuration 28 when this portion of tube 12 is free of any deforming influences. The deformable characteristic of tube 12 allows portion 25 of the tube to assume a substantially straight disposition when a guidewire 26 is threaded through the catheter as shown in FIG. 6, but the inherent resiliency of the material of tube 12 is relied upon to assure that portion 25 assumes the loop configuration shown in FIG. 1 when the guidewire is withdrawn from the catheter. Loop configuration 28 is useful in a catheter according to this invention when it is desired to use the catheter to measure left ventricular volume and cardiac output, as shown in FIG. 2, for example.

Probe 19 has an anterior terminal portion 30 which lies outside the outer lumen of catheter 10 and which is defined by passing the probe through a tightly cooperating opening 31 formed in tube 12. Opening 31 is located closely adjacent coolant exit apertures 27 but preferably towards the posterior end of tube 12 from the apertures. Preferably probe 19 is passed through an opening 32 disposed more toward the posterior end of tube 12 than opening 31, but still adjacent apertures 27, and then from the exterior of tube 12 back into the interior of the tube through an opening 33 disposed between openings 31 and 32. The probe is then passed through opening 31 to define anterior terminal portion 30. This arrangement is shown clearly in FIG. 6. This passage of probe 19 out of tube 12 through opening 32, back into the tube through opening 33, and then finally again out of the tube through opening 31 is desired to assure that probe 19 is securely connected to tube 12 adjacent the anterior terminal portion of the probe. This arrangement provides a connection of probe 19 to tube 12 independently of the interference fit between the probe and the tube at opening 31. The result is that the portion of probe 19 which lies outside tube 12 adjacent the anterior end of catheter 10 does not bend or flex relative to tube 12 at a hard connection between the probe and the tube; this characteristic assures that catheter 10 may be used repeatedly without failure of the probe at the location at which the probe passes from the interior of tube 12. As shown in FIG. 6, it is preferred that the portion of probe 19 which lies outside tube 12 between openings 32 and 33 be laced to the tube by a few turns of very fine wire 35, and that the wire be encased within a suitable sealant 36, such as an epoxy resin, which also functions to seal openings 32 and 33 around the probe.

As shown in FIG. 4, for example, an electrical temperature sensing device 40, preferably a thermistor, is mounted in probe 19 adjacent to coolant exit apertures 27, but between opening 32 and the posterior end of the catheter. Thermistor 40 is disposed at a location in probe 19 which is sufficiently spaced from opening 32 that the probe, at the location of the thermistor therein, floats freely within the interior of tube 12. It is preferred that the sensing devices used in catheter 10 have the characteristic that their impedance varies in relation to their temperature. The preferred sensing devices are thermistors which are very small devices made of semi-conductor material and which have the characteristic that the logarithms of their resistivity vary substantially linearly as a function of temperature. It is also preferred that the sensing devices used in a catheter of this invention have the greatest sensitivity and smallest response time possible.

Thermistor 40 is disposed in intimate engagement with the walls of tubular probe 19. This intimate engagement between the thermistor and the walls of probe 19 may be assured by using a thermistor which is slightly larger in diameter than the inner diameter of the probe, as shown in FIG. 5. Alternatively, if desired, thermistor 40 may be disposed snugly within an opening formed through the tubular probe, as described in my prior U.S. Pat. No. 3,545,428. Either of these mountings of the thermistor within probe 19 assures that the thermistor will operate accurately to sense the temperature of coolant liquid flowing past the thermistor through passage 16 during use of the catheter. Because of the function which thermistor 40 forms during use of catheter 10, thermistor 40 is conveniently referred to as a "coolant thermistor." The coolant thermistor is connected to the exterior of catheter 10 by two conductors 41 which extend along the interior of probe 19 to connector 22. Preferably conductors 41 are defined by very small diameter insulated manganin wire or the like.

A second thermistor 42, shown in FIG. 5, is carried by probe 19 at its extreme anterior end 20 and is secured relative to the probe in a bead of adhesive such as epoxy resin 43. Thermistor 42 is connected to the exterior of the catheter by a pair of conductors 44 which extend back through probe 19 to connector 22. A minimum amount of adhesive is used to secure thermistor 42 to the extreme end of probe 19 so that the thermistor responds rapidly to variations in temperature of liquid flowing past this thermistor. Because of the function which thermistor 42 performs during use of catheter 10, this thermistor may be referred to conveniently as a "dilution thermistor."

It was noted above that probe 19 is fabricated of very small diameter, flexible, relatively thin-wall tubing. Accordingly, that portion of probe 19 which extends outside tube 12 adjacent the anterior end of the catheter is essentially limp and flaccid. The anterior terminal portion of probe 19, by appropriate manipulation of the catheter in a blood vessel or heart chamber, may be disposed to trail back along the length of the catheter as shown in FIG. 1 for use during retrograde flow circumstances, or to trail forwardly to its connection to the tube for use in antegrade flow circumstances. During catheter insertion, the probe anterior terminal portion 30 trails behind the anterior end of the catheter, but may be disposed to trail forward of the catheter anterior end for antegrade usage by overshooting the desired body location on insertion and then withdrawing the catheter a short distance; during such limited withdrawal, the probe anterior terminal portion, because of its flaccidity, doubles back on itself to trail forwardly from coolant exit apertures 27. Regardless of whether the catheter is used in antegrade or retrograde flow conditions, the spacing of dilution thermistor 42 from the point at which probe 19 passes from the interior of tube 12 via opening 31 is sufficient that the dilution thermistor is spaced from coolant exit apertures 27 along the blood vessel in the direction of blood flow. Therefore, by the time blood into which coolant has been injected via apertures 27 reaches the position of dilution thermistor 42 in the blood vessel, the blood and coolant will have mixed thoroughly; dilution thermistor 42 senses the temperature of the blood as reduced by thorough admixture with the coolant liquid. Also, because of the flaccidity of the probe anterior terminal portion, the probe outside tube 12 floats thermally and physically freely relative to the tube. Thus, the dilution thermistor in use is disposed clear of the portion of the catheter through which coolant liquid flows (or only very lightly contacts either the catheter tube or the vessel wall) so that the dilution thermistor is only minimally influenced by the coolant liquid flowing in the catheter or by the vessel wall which is at body temperature. Similarly, the coolant thermistor floats freely thermally and physically within tube 12 on probe 19 and is only minimally influenced by the temperature of blood flowing along the exterior of the catheter. This thermal and physical floating mounting of the thermistors assures that measurements obtained by use of the catheter are accurate.

The readout circuitry and equipment to which thermistors 40 and 42 are connected via connector 22 is shown in my prior U.S. Pat. No. 3,545,428 to which reference is made in lieu of a detailed description of such circuitry and equipment at this point herein. This circuitry conventionally includes Wheatstone bridge circuits or the like to which the several thermistors are connected for measurement of their impedance variations with time. Ideally, this circuitry includes a strip chart recorder responsive to the output voltage of the bridge circuits.

When catheter 10 is used to measure blood massflow, the catheter is inserted into a blood vessel and moved along the blood vessel from the location of insertion to the desired location within the body where blood flow measurements are to be made. Insertion of the catheter into the blood vessel may be accomplished by percutaneous techniques by means of a hypodermic needle or the like. For example, in situations where blood flow measurements are to be made in the left ventricle of the heart or in the aorta, the catheter may be inserted into the femoral artery in the vicinity of the groin and passed to the desired location in the aorta or left ventricle by appropriate manipulation of the catheter by known techniques; see, for example, "Bedside Catheterization of the Left Ventricle," by Jay N. Cohn et al., The American Journal of Cardiology, Jan., 1970, pages 66–69. The catheter insertion process may be facilitated by use of a fluoroscope, and it is for this reason that tube 12 which defines the outer lumen of catheter 10 is fabricated of X-ray-opaque material. Once the anterior portions of the catheter have reached the desired body location, the guidewire is withdrawn from the catheter, thereby relaxing the straightening bias imposed to the anterior terminal portions of tube 12 and allowing these portions of tube 12 to resume their normal state wherein the anterior terminal portion 25 of the catheter defines loop configuration 28.

FIG. 2 illustrates the use of catheter 10 for the purposes of obtaining simultaneous measurements of the volume of the left ventricle of the heart and of cardiac output. FIG. 2 includes a simplified representation of a human heart 47 and particularly the left atrium 48, left ventricle 49, a portion of the right ventricle 50, ascending aorta 51, and the descending aorta 52. Particularly in cases where catheter 10 is used to obtain measurements of left ventricular volume, it is desired that the anterior terminal portion of tube 12 be biased to define loop configuration 28 which facilitates passage of the catheter through aortic valve 53 and which assures that the extreme anterior end 13 of the catheter cannot come into sufficient contact with the walls of the left ventricle to induce arrythmia of the heart. To obtain measurements of left ventricular volume, catheter 10 is positioned so that coolant exit apertures 27 are disposed within the left ventricle but that dilution thermistor 42 is spaced back along the body of catheter 10 in the direction of blood flow from the left ventricle to be disposed in aorta 51 downstream from the aortic valve 53 of the left ventricle.

Once the catheter has been positioned in the manner shown in FIG. 2, for example, dilution thermistor 42 is used to provide a measurement of the temperature of the blood flowing past this thermistor under normal circumstances. Then a coolant liquid bolus of predetermined magnitude is injected into left ventricle 49 through coolant exit apertures 27 to thoroughly mix with the blood present in the left ventricle. Thorough mixture of the coolant liquid and blood is assured by the design of the jet discharge means of the catheter and by the energy of the coolant liquid as it jets from the catheter. Coolant thermistor 40 is used to ascertain the temperature of the coolant liquid injected as a bolus into the left ventricle. Thereafter, dilution thermistor 42 is used to measure the thermal dilution washout curve the area under which is pertinent to cardiac output and the step height of which is a factor pertinent to ventricular volume. A full and complete description of the application of thermal dilution techniques to the measurement of left ventricular volume of the human heart is set forth in "Measurement of left ventricular volume by thermo-dilution: an appraisal of technical errors," by Doctors Rolett, Sherman and Gorlin, Journal of Applied Physiology, Vol. 19, No. 6, November, 1964. See also "Simultaneous determination of the stroke volume and left ventricular residual fraction with the fiberoptic and thermodilution method" by Doctors Bussmann, Krayenbuhl and Rutishauser, Cardiovascular Research, 1971, No. 5, pages 136–140, and "A New Technique for Measurement of Cardiac Output by Thermodilution in Man," by Ganz et al., American Journal of Cardiology, April, 1971, pages 392–396. The area under the thermal dilution washout curve provides the integral appearing in the equation set forth by Ganz et al. at page 394.

FIG. 8 is an enlarged cross-sectional elevation view of the anterior terminal portion of another catheter 60 according to this invention. Catheters 10 and 60 are essentially identical to each other, except to the extent illustrated in FIG. 8 pertaining to the anterior portion of catheter 60. For this reason the preceding description of catheter 10 is relied upon. Catheter 60 like catheter 10 includes an outer tube 12' (similar to tube 12 except to the extent described or shown) and elongate, small diameter, flexible and essentially flaccid probe 19' which extends along the interior of tube 12 in the manner described above. A plurality of coolant exit apertures 27' are provided through the walls of tube 12' at the anterior end 17 of a coolant fluid passage 16 through the tube. Apertures 27' are located substantially closer to the extreme anterior end 61 of catheter 60 than are apertures 27 in catheter 10. Preferably apertures 27' are formed through the tapered portion of tube 12' in the transition from its nominal diameter to a reduced diameter portion 62 which extends to a tube anterior end opening 61. Coolant liquid injected into tube 12' at its posterior end discharges from the tube principally through apertures 27' and through opening 61. The flow path of coolant out of apertures 27' is oblique to and forwardly of the catheter for thorough mixing with blood flowing past the apertures. As shown in FIG. 8, the extreme anterior end portion of tube 12' is bulbed, as at 63, to prevent damage to the coronary sinus in which catheter 60 is adapted for use. The opening of passage 16 through the anterior end of tube 12', as well as the opening of apertures 27' toward the exterior of reduced diameter portion 62, adapts the catheter for use as a sampling catheter as well as a flowmeter catheter; opening 61 and apertures 27' cannot all be blocked by the vessel wall as it tends to collapse or constrict about the catheter as the catheter is used for sampling.

A pair of dilution thermistors 66 and 67 are carried in an anterior terminal portion 68 of probe 19' which is disposed externally of tube 12'. Portion 68 of probe 19' corresponds to portion 30 of probe 19 in catheter 10. In catheter 60, however, dilution thermistors 66 and 67 are spaced from each other along probe portion 68 between the exterior of tube 12' and the extreme anterior end 69 of probe 19'.

Probe 60 is useful in obtaining measurements of blood massflow in the coronary sinus, among other locations in the circulatory system. Dilution thermistors 66 and 67 preferably are spaced along anterior terminal portions 68 of probe 19' so that the relative flows of the two major veins opening to the coronary sinus just upstream of the ostium may be ascertained. Preferably, dilution thermistors 66 and 67 are spaced sufficiently from the extreme anterior end of probe 19' that probe end 69 remains within the right atrium when the catheter is disposed in the coronary sinus. Upon withdrawal of the catheter from the coronary sinus, the anterior terminal portion of probe 19' is not induced to trail back past the extreme anterior end of tube 12' until the anterior end of the catheter has been withdrawn into the right atrium, for example.

It will be apparent that catheter 60, by reason of its inclusion of two spaced dilution thermistors in the external anterior terminal portion of probe 19', is useful in obtaining blood massflow measurements both upstream and downstream of junctions within the circulatory system, regardless of whether the flow characteristic past the catheter is an antegrade characteristic or a retrograde characteristic. These measurements may be obtained by simultaneous or serial application of the conductors from the two dilution thermistors to the readout circuitry and equipment to which posterior end of the catheter may be connected.

The present invention has been described above in the context of two presently preferred embodiments of the invention. These embodiments have been described as examples of the various forms which the invention may take. Persons skilled in the art to which this invention pertains will realize that the exemplary dimensions and arrangements described above may be altered without departing from the scope of the invention. Similarly, persons skilled in the art will recognize that certain of the features of catheter 10 may be used with certain of the features of catheter 60, as by use of the external probe arrangement shown in FIG. 8 with the loop-configured tube anterior end arrangement shown in FIG. 1, all without departing from the scope of the invention. Accordingly, the foregoing description should not be construed as expressly limiting the scope of the invention.

What is claimed is:

1. A catheter comprising an elongate slender flexible tube, a slender flexible and flaccid probe disposed within the tube through a substantial portion of the length of the tube, the probe having an outer diameter sufficiently less than the inner diameter of the tube to provide a liquid flow passage within the tube around the probe to an anterior end thereof adjacent an anterior end of the tube, means coupled to the posterior end of the tube for injecting a coolant liquid into the passage, coolant liquid discharge means from the passage adjacent the anterior end of the passage, the probe extending through the tube adjacent the coolant liquid discharge means to a terminal portion thereof disposed externally of the tube, and an electrical temperature sensing device mounted to the terminal portion of the probe for sensing the temperature of liquid flowing therepast.

2. A catheter according to claim 1 including a second temperature sensing device operatively disposed in the passage for sensing the temperature of liquid flowing therepast.

3. A catheter according to claim 2 wherein the second temperature sensing device is disposed in the passage adjacent the coolant liquid discharge means.

4. A catheter according to claim 2 wherein the second temperature sensing device is carried by the probe.

5. A catheter according to claim 1 wherein the probe terminal portion extends to an anterior end disposed externally of the tube and movable relative to the tube.

6. A catheter according to claim 1 wherein the probe terminal portion is movable relative to the tube externally of the tube.

7. A catheter according to claim 1 wherein the temperature sensing device is disposed at the anterior end of the probe.

8. A catheter according to claim 1 wherein the temperature sensing device is disposed intermediate the elongate extent of the probe terminal portion.

9. A catheter according to claim 1 including a second electrical temperature sensing device mounted to the probe terminal portion and spaced therealong from the first sensing device.

10. A catheter according to claim 1 wherein the spacing of the sensing device along the probe terminal portion from the location at which the probe extends through the tube is greater than the spacing of said location along the tube from the coolant liquid discharge means.

11. A catheter according to claim 10 wherein said location is spaced posteriorly along the tube from the coolant liquid discharge means.

12. A catheter according to claim 1 wherein the sensing device is a thermistor.

13. A catheter according to claim 1 including conductor means connected to the sensing device and extending posteriorly thereof within the probe to a posterior end of the probe disposed externally of the tube.

14. A catheter according to claim 1 wherein the tube and passage anterior ends are spaced along the tube and the tube therebetween defines a duct to the tube anterior end, the duct having a diameter which is substantially reduced from the diameter of the passage.

15. A catheter according to claim 14 wherein the duct has a diameter which corresponds to the diameter of a guidewire for the catheter.

16. A catheter according to claim 14 wherein the tube anteriorly from the anterior end of the passage is arranged normally to define a loop configuration which is deformable to substantially coaxial alignment with the adjacent portions of the tube.

17. A catheter according to claim 1 wherein the probe is fixedly connected to the tube proximate the location at which the probe extends through the tube to the probe terminal portion.

18. A flowmeter catheter comprising an elongate slender flexible tube, a slender flexible and flaccid probe disposed within the tube through a substantial portion of the length of the tube, the probe having an outer diameter sufficiently less than the inner diameter of the tube to provide a liquid flow passage within the tube around the probe to an anterior end thereof adjacent an anterior end of the tube, means coupled to the posterior end of the tube for injecting a coolant liquid into the passage, coolant liquid discharge means from the passage adjacent the anterior end of the passage, the probe extending through the tube posteriorly of but adjacent the coolant liquid discharge means to a terminal portion thereof disposed externally of the tube, a first thermistor mounted to the end of the terminal portion of the probe for sensing the temperature of liquid flowing therepast, the spacing of the first thermistor along the probe from the location at which the probe extends through the tube being greater than the spacing of said location along the tube from the coolant liquid discharge means, a second thermistor carried by the probe within the tube adjacent the coolant liquid discharge means for sensing the temperature of liquid flowing therepast in the passage, and conductor means extending from the thermistors within the probe to the posterior end of the probe externally of the tube.

19. A flowmeter catheter comprising an elongate slender flexible tube, a slender flexible and flaccid probe disposed within the tube through a substantial portion of the length of the tube, the probe having an outer diameter sufficiently less than the inner diameter of the tube to provide a liquid flow passage within the tube around the probe to an anterior end thereof adjacent an anterior end of the tube, means coupled to the posterior end of the tube for injecting a coolant liquid into the passage, coolant liquid discharge means from the passage adjacent the anterior end of the passage, the probe extending through the tube posteriorly of but adjacent the coolant liquid discharge means to a terminal portion thereof disposed externally of the tube, spaced first and second thermistors mounted to the terminal portion of the probe intermediate the length of the terminal portion for sensing the temperature of liquid flowing therepast, the spacing of the first and second thermistors along the probe from the location at which the probe extends through the tube being greater than the spacing of said location from the coolant liquid discharge means, a third thermistor carried by the probe within the tube adjacent the coolant liquid discharge means for sensing the temperature of liquid flowing therepast in the passage, and conductor means extending from the thermistors within the probe to the posterior end of the probe externally of the tube.

\* \* \* \* \*